G. S. EVERHART.
NONSKID CHAIN DEVICE.
APPLICATION FILED NOV. 17, 1917.

1,407,741. Patented Feb. 28, 1922.

Witnesses
Milton Lenoir
Albin C. Ahlberg

Inventor
George S. Everhart
by Williams, Bradbury Lee
Attorneys.

UNITED STATES PATENT OFFICE.

GEORGE S. EVERHART, OF OSHKOSH, WISCONSIN.

NONSKID CHAIN DEVICE.

1,407,741.    Specification of Letters Patent.    Patented Feb. 28, 1922.

Application filed November 17, 1917. Serial No. 202,631.

*To all whom it may concern:*

Be it known that I, GEORGE S. EVERHART, a citizen of the United States, residing at Oshkosh, in the county of Winnebago and State of Wisconsin, have invented a certain new and useful Improvement in Nonskid Chain Devices, of which the following is a full, clear, concise, and exact description, reference being had to the accompanying drawings, forming a part of this specification.

My invention relates to non-skid devices for vehicle wheels, and has for its general object the provision of a device of this character which will be strong and efficient and one that may be produced at low cost. More particularly my present invention has to do with that type of non-skid arrangements wherein a number of chain units are utilized on each vehicle wheel, and I arrange the parts so that two cross chains are carried by a pair of clamping members which consist in drop forged bars having eyes in each end for the reception of one end of a chain. Thus the necessity for a pair of clamping members for each cross chain is eliminated, making it possible to use fewer parts to produce a satisfactory non-skid device. The construction of my device will be understood better as the specification progresses, and by reference to the accompanying drawings, in which Figure 1 is a perspective view of part of a motor car having one of the devices of my invention attached;

Similar characters of reference refer to similar parts throughout the several views.

Figure 1:
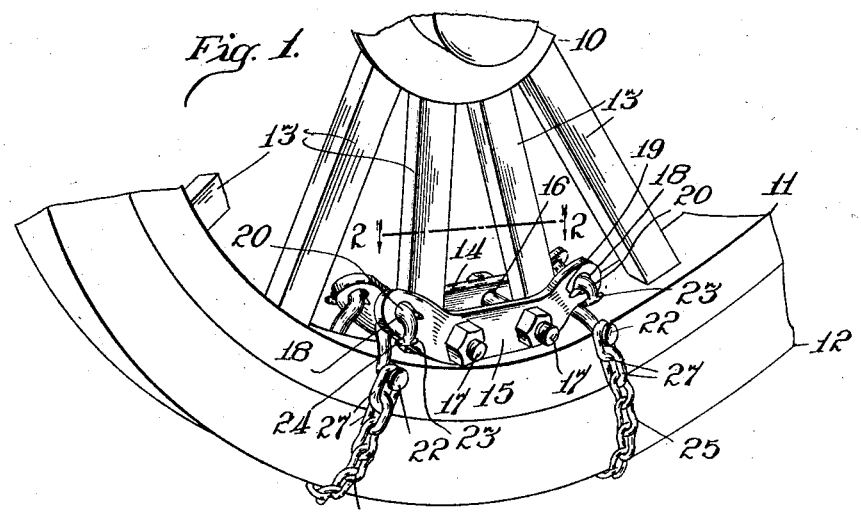
Figure 2:
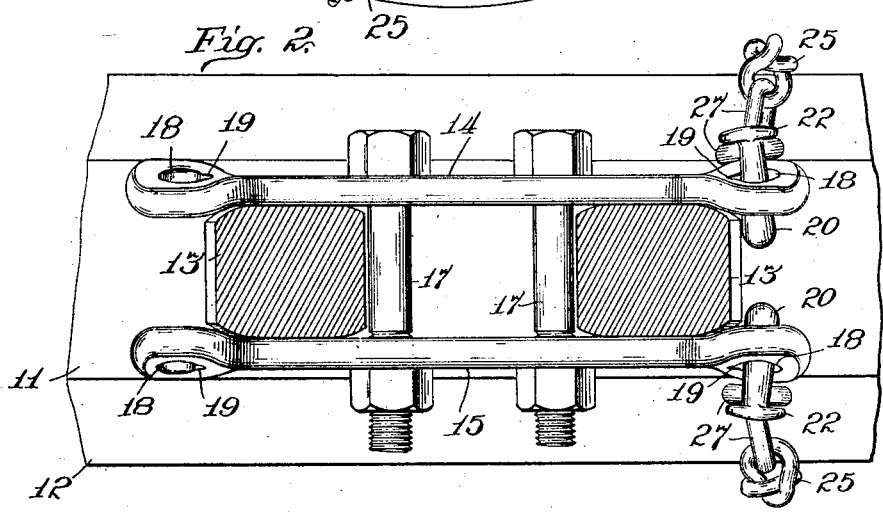
Figure 2 is a sectional view taken on the line 2—2 of Figure 1 and looking in the direction of the arrows, showing the relative position of the parts and the method of attaching the same.
Figure 5:
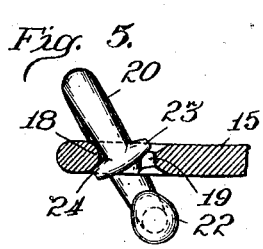
Figure 5 is a fragmentary detail view showing the method of inserting and attaching the hook to the clamping member.
Figure 3:
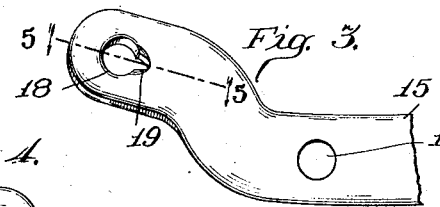
Figure 3 is a fragmentary view of one of the clamping members.
Figure 4:
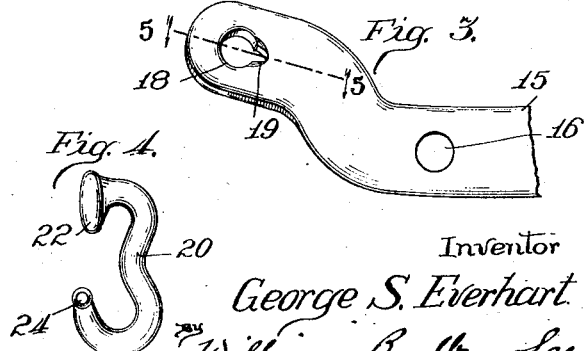
Figure 4 is a detail view showing one of the hooks by means of which the cross chains are attached to the clamping members.

Referring first to Figure 1, I have shown the usual form of vehicle wheels employed in connection with a motor car, and this wheel consists essentially of a hub 10, a felly 11 having a tire 12 and having spokes 13, 13 disposed between the hub and the felly. The clamping members 14 and 15 have edgewise offset end portions each provided with a pair of apertures 16, 16 through which a pair of bolts 17, 17 extend for clamping the members securely upon two adjacent spokes. It will be noted that the bolts are located between adjacent spokes when the device is attached to the vehicle wheel, and that the clamping members engage the inner side of the felly. The clamping members preferably are drop forged and are provided with keyhole slots 18 through which a hook 20 is arranged to extend in order to hold the cross chains on the wheel. Both ends of the clamping members are inclined relative to the plane of the central portions of the clamping members, as shown in Figure 2. By thus inclining the end portions of the clamping members, the clamping members will engage the bight of the hooks 20 nearer to the shank portion of the hook than they would if the end portions were in the plane of the central portions of the clamping members. There is consequently not so great a leverage placed upon the hook at the point where the bight starts as there would be if the clamping members engaged the hooks at a point nearer the ends of the hooks. It is also easier to manipulate the hooks through the openings in the clamping members with the end portions thereof inclined as described. At one end the hook 20 is provided with an enlarged end 22 and at the other end with a reversely curved T-shaped bill comprising lugs 23 and 24 extending in opposite directions. I find that this hook is an expedient means for removably attaching the chain to the clamping members, and that it is easily attached, and will not become disconnected by accident. To attach the hook to the chain the crosshead is inserted into one of the links of the cross chains 25, 25, and is then brought around so that the link engages the neck of the hook immediately adjacent the enlarged end 22. As will be seen by reference to Figure 5 the hook is connected with the clamping bar by first inserting the lug 24 of the crosshead into the aperture 18 and then manipulating the hook to cause the lug 23 to pass through the slot of keyhole slot 18. It will be seen in Figures 1 and 2 that the chain 25 has on each end thereof several flat chain links 27, 27 connected with the intermediate portion of the chain, which is composed of twisted links in order that the same may lie as flatly as possible on the tire and thus cause a minimum amount of wear on the same. If it is desired to take up slack existing in the cross chains, this may be done by detaching the end link from the hook 20 and slipping the link next to the end over the same. With the use of chains of larger size I find it unnecessary to provide the flat links at each end as the space provided by the twisted links is sufficient to admit the hook 20.

In attaching the non-skid device to the wheel the chains having the hooks 20 on each end thereof connected with the clamping bars are brought around the tire and felly so that it will be possible to insert the bolts 17, 17 through the apertures 16, 16 carried by the clamping members. The nuts are screw-threaded onto their associated bolts so that the clamping members may be brought toward each other. By taking advantage of the slack afforded by the flat chain links, the clamping bars may first be clamped to the spokes, and the chains then attached to the bars by manipulating the hooks through the keyhole slots 18. It will be noted that by offsetting the ends of the clamping bars edgewise, a space is provided between the ends of the bars and the felly through which the shanks of the hooks can pass. This permits the hooks to be easily manipulated through the keyhole slots and to drop to a position in which they can best resist the strain imposed thereon. In use I find it desirable to attach several non-skid devices preferably to embrace several pairs of spokes.

Having thus described my invention, what I claim as new and desire to secure by Letters Patent of the United States is:

1. The combination with a vehicle wheel comprising spokes and a felly of a pair of clamping bars having edgewise offset end portions provided with openings, of means for clamping said clamping bars upon opposite sides of a pair of adjacent spokes with the outer edges of said clamping bars resting against said felly and with said end portions spaced from said felly to form clearance spaces, a pair of anti-skid chains, a hook secured to each end of said chains, the hooks of one chain being manipulated through the openings at one end of said bars and the hooks of the other chain being manipulated through the openings at the other end of said bars, the shanks of said hooks passing through said clearance spaces.

2. The combination with a vehicle wheel comprising spokes and a felly, of a clamping bar having an edgewise offset end portion provided with an opening, means for clamping said bar to a pair of adjacent spokes of said wheel with the outer edge of said bar in contact with said felly and with said end portion spaced from said felly to form a clearance space, an anti-skid chain, a hook secured to the end of said anti-skid chain and having a portion passing through the opening in said offset portion, the shank of said hook extending through said clearance space.

3. The combination with a vehicle wheel, comprising spokes and a felly, of a clamping bar having an edgewise offset end portion provided with an opening, means for clamping said bar to a pair of adjacent spokes of said wheel substantially parallel with said felly and with said edgewise offset end portion spaced from said felly to form a clearance space, an anti-skid chain, a hook secured to the end of said anti-skid chain and having a portion passing through the opening in the said offset portion, the shank of said hook extending through said clearance space.

4. Means for securing an anti-skid chain to a vehicle wheel, comprising an elongated bar having an edgewise offset end portion, said end portion being inclined to the plane of the central portion of said bar and being provided with an opening for receiving means for securing an anti-skid chain to said bar.

5. Means for securing an anti-skid chain to a vehicle wheel, comprising an elongated bar having an edgewise offset end portion provided with an opening for receiving means for securing an anti-skid chain to said bar.

6. The combination with a vehicle wheel comprising a felly and spokes, of a clamping bar having an end portion offset from one edge thereof to form a clearance space between said end portion and felly, means for clamping said bar to a pair of adjacent spokes, a flexible anti-skid member having one end connected with the offset portion of said bar and extending through said clearance space.

In witness whereof, I hereunto subscribe my name this 14th day of November, 1917.

GEORGE S. EVERHART.

Witnesses:
N. EVERHART RIEBS.
G. E. BERESFORD.